United States Patent [19]
Terada et al.

[11] Patent Number: 6,041,399
[45] Date of Patent: Mar. 21, 2000

[54] VLIW SYSTEM WITH PREDICATED INSTRUCTION EXECUTION FOR INDIVIDUAL INSTRUCTION FIELDS

[75] Inventors: Koichi Terada, Yokohama; Keiji Kojima, Sagamihara; Yoshifumi Fujikawa, Hiroshima-ken; Tohru Nojiri, Tokyo; Kiyokazu Nishioka, Odawara, all of Japan

[73] Assignee: Hitachi, Ltd., Tokyo, Japan

[21] Appl. No.: 08/884,667

[22] Filed: Jun. 27, 1997

[30] Foreign Application Priority Data

Jul. 11, 1996 [JP] Japan .................................. 8-182141

[51] Int. Cl.$^7$ ........................................................ G06F 9/38
[52] U.S. Cl. .............................. 712/24; 712/226; 712/234
[58] Field of Search .............................. 712/24, 226, 236, 712/234

[56] References Cited

U.S. PATENT DOCUMENTS

| | | | |
|---|---|---|---|
| 5,450,556 | 9/1995 | Slavenburg et al. | 712/24 |
| 5,530,817 | 6/1996 | Masubuchi | 712/24 |
| 5,555,428 | 9/1996 | Radigan et al. | 712/24 |

OTHER PUBLICATIONS

Steven, G. B. et al., iHARP: a multiple instruction issue processor, IEEE Proceedings of Computers and Digital Techniques, vol. 139, Issue 5, Sep. 1992.
Findlay, P. A. et al., HARP: a VLIW RISC processor, Proceedings of the 5$^{th}$ Annual European Computer Conference on Advanced Computeer Technology, Reliable Systems, and Applications, May 13–16, 1991.
Steven, G. B. et al., The development of iHarp: amultiple instruction isssue processor chip, IEEE Colloquium on RISC Architectures and Applications, 1991.
Tirumalai, P. et al., Parallelization of loops with exits on pipelined architectures, Proceedings of Supercomputing '90, Nov. 12–16, 1990.

*Primary Examiner*—Richard L. Ellis
*Attorney, Agent, or Firm*—Antonelli, Terry, Stout & Kraus, LLP

[57] ABSTRACT

In the case of constituting a processing unit having the characteristic of a VLIW type processing unit and the characteristic of a pipeline type processing unit, since reference to the result of operations is made among a plurality of processing units executing in parallel the operations, transfer of the register file is frequently generated among the processing units, resulting in insufficient effect of the high speed operations. In view of solving this problem, the predicate registers are provided and moreover a means for broadcasting the update data of the predicate register to all processing units is also provided. Thereby, operations for obtaining branching condition and numerical value can be realized in different processing units and the number of steps of the processing program can be reduced. In addition, since high speed transfer between the processing units of the data register having a wider bit width is no longer required and thereby the mounting area can be reduced and high speed processing unit can be realized.

13 Claims, 9 Drawing Sheets

```
001        cmp   r1, #2
002        ble   $1
003        sub   r1, #1, r1
004   $1: add   r2, r1, r2
```

FIG. 3

```
001        cmp.gt r1, #2, p0
002   (p0) sub    r1, #1, r1
003        add    r2, r1, r2
```

```
ld    r1,(0000)
xfer  r1
```

```
        ld    r2, (0001)
        ld    r3, (0002)
        cmp.eq r1, #0,p1
(p1)    add   r2,r3,r4
        cmp.eq r1,#1,p1
(p1)    sub   r2,r3,r4
```

```
        ld    r5, (0003)
        ld    r6, (0004)
        cmp.eq r1, #0,p1
(p1)    mul   r5,r6,r7
        cmp.eq r1,#1,p1
(p1)    div   r5,r6,r7
```

FIG. 12

```
ld    r1,(0000)
cmp.eq r1,#0,p1,B
cmp.eq r1,#1,p1,B
```

```
        ld    r2, (0001)
        ld    r3, (0002)
(p1)    add   r2,r3,r4
(p1)    sub   r2,r3,r4
```

```
        ld    r5, (0003)
        ld    r6, (0004)
(p1)    mul   r5,r6,r7
(p1)    div   r5,r6,r7
```

FIG. 15

```
ld    r1,(0000)
cmp.eq r1,#0,p1
cmp.eq r1,#1,p1
```

```
        ld    r2, (0001)
        ld    r3, (0002)
(p0:1)  add   r2,r3,r4
(p0:1)  sub   r2,r3,r4
```

```
        ld    r5, (0003)
        ld    r6, (0004)
(p0:1)  mul   r5,r6,r7
(p0:1)  div   r5,r6,r7
```

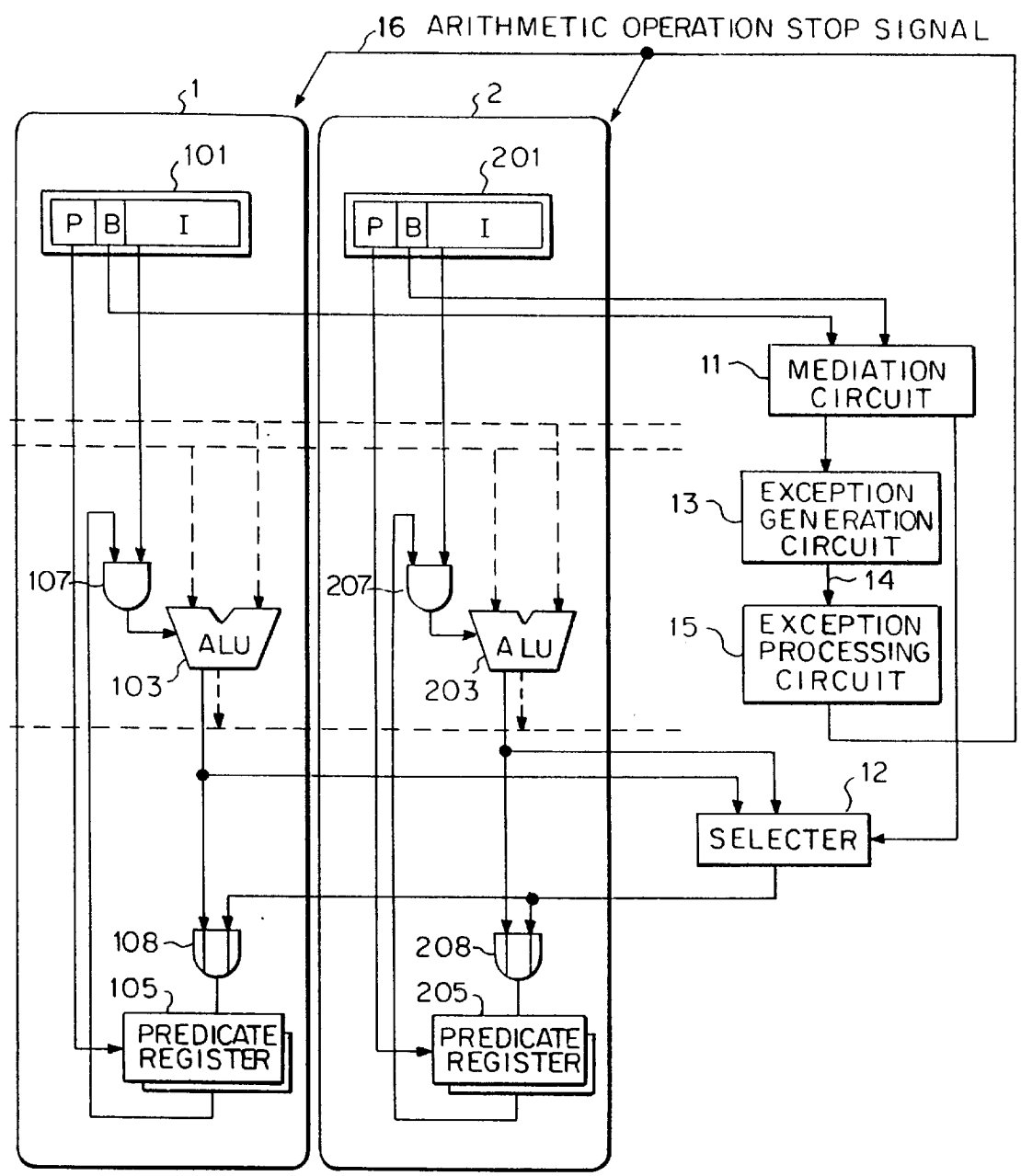

VLIW SYSTEM WITH PREDICATED INSTRUCTION EXECUTION FOR INDIVIDUAL INSTRUCTION FIELDS

BACKGROUND OF THE INVENTION

The present invention relates to a processing unit having a plurality of instruction fields in one instruction word register to execute in parallel these instructions.

A traditional processing unit has generally been structured to execute one processing with one instruction word and to execute in series processing one by one for the stream of instruction words.

A processing unit developed in recent years, on the other hand, has an instruction system which can process a plurality of instructions with only one instruction word and execute in parallel these instructions in order to improve the execution speed. This processing unit is generally called as a VLIW (Very Long Instruction Word) type processing unit.

The processing unit of this type comprises a plurality of processing units to execute in parallel a plurality of instructions. Moreover, this processing unit has a plurality of register files corresponding to a plurality of processing units to allow respective processing units to independently execute the processing. In the case of executing the particular processing using such a plurality of processing units, data communication between processing units is generally indispensable. For this purpose, therefore, the processing unit of this type has, for example, a means for transferring register value between a plurality of processing units or a means such as a common register which can be accessed from a plurality of processing unit. As this processing unit, for example, the technique is disclosed in the Japanese Patent Application Laid-Open No. 5-233281.

In addition to such means for realizing high speed execution explained above, there is provided a processing unit in which the processing itself is divided in time series into a plurality of stages and a plurality of independent stages execute the processing in series. These processing units are called pipeline type processing units.

It is known that the processing units of this type are capable of showing the maximum performance when the instruction words are arranged in series. Meanwhile, in the case of processing where the instruction words are not arranged in series and, for example, condition branching instructions are included, pipeline control is disturbed and tentative deterioration of performance is generated.

In view of overcoming such problems, the processing unit of this type has been modified to reduce the conditional branching processes. A typical method is use of a predicate register.

The predicate register is a register to modify the instruction words to determine whether the relevant instruction words are executed or not. Use of the predicate register enables remarkable reduction of the frequency in use of the condition branching instructions. For understanding of the present invention described later, this performance will be briefly explained with reference to the drawings.

FIG. 2 shows an example of the program using the C language. FIG. 3 shows an example where the program of FIG. 2 is compiled into the format to be applied to the processing unit of the related art. FIG. 4 shows an example where the program of FIG. 2 is compiled into the format to be applied to the processing unit using a predicate register. As shown in these figures, the arithmetic or logical processes realized by the condition branching in FIG. 3 can be realized in FIG. 4 without requiring the condition branching process. The second line in FIG. 4 describes an instruction word using the predicate register. With the comparison instruction of the first line, a value of the comparison result is written into the first predicate register (p0). The subtraction instruction of the second line is executed only when the value stored in p0 is "true" depending on the description "(p0)" preceding the instruction word. If a value stored in p0 is "false", although the subtraction instruction of the second line is read, then the subtraction process is not executed. With such executing method, the condition branching processes can be reduced.

However, when the means to realize such high speed processing explained above is used in combination, namely when the processing unit having the characteristics of the VLIW type processing unit and characteristic of the pipeline type processing unit is structured, there are following problems.

Since references are executed for processing results with each other between a plurality of processing units which are executing in parallel the processes, transfer processes of register file are frequently generated between processing units and the sufficient high speed operation effect owing to the parallel processes or pipeline processes cannot be obtained in some cases.

In addition, the high speed processes cannot be realized because the number of program steps for the transfer process is increased.

OBJECT AND SUMMARY OF THE INVENTION

It is therefore an object of the present invention to provide a processing unit which permits a plurality of processing units to execute in parallel the processes utilizing the operation results with each other so that the processing units can save with each other the time required to reflect the operation result and enable high speed processes.

Moreover, it is another object of the present invention to provide a processing unit which permits a plurality of processing units to execute in parallel the processes utilizing the operation results with each other so that the number of steps of the processing program can be reduced.

It is further object of the present invention to provide a processing unit which permits a plurality of processing units to execute in parallel the processes utilizing the operation results with each other so that the processing units can save the time required to reflect the operation result with each other, generate an instruction format for reducing the number of steps of the processing program and executes such instruction.

According to an aspect of the present invention, there is provided a processing apparatus having a plurality of processing circuits. Each processing circuit includes a sending circuit which sends information based on a result of an instruction in one of the processing circuits to at least one other processing circuit during executing the instruction, and an ALU for executing instructions considering the information sent from the one processing circuit.

According to an aspect of the present invention, there is provided a compiler software, stored on a storage medium, for generating instruction strings used in a processing apparatus having a plurality of processing circuits. The compiler software when executed by a computer causes said computer to perform the steps of arranging instructions into instructions strings to be executed by the processing circuits in parallel, and generating for each instruction an instruction field format used in one of the processing circuits. The instruction field format having a send field for sending the result of the instruction field to at least one other processing circuit.

According to an another aspect of the present invention, there is provided a method for executing instructions in a processing apparatus having a plurality of processing circuits, including a step for sending a result of an instruction in one of the processing circuits to at least one other processing circuit during the; instruction executed in the one processing circuit, and a step for executing instructions in an ALU in the at least one other processing circuit considering the result sent from the one processing circuit.

According to yet another aspect of the present invention, there is provided an information processing system including a processing apparatus having a plurality of processing circuits. Each processing circuit includes a sending circuit which sends a result of an instruction in one of the processing circuits to at least one other processing circuit during executing the instruction, and an ALU for executing instructions considering the result sent from the at least one other processing circuit, and a memory for storing an instruction for the processing apparatus. The instruction includes a field for reporting the result of the instruction executed by the one processing circuit to the at least one other processing circuit.

According to a further aspect of the present invention, there is provided a processing apparatus for executing a plurality of instruction fields in one instruction word in parallel, including a plurality of registers provided corresponding to a plurality of instruction field groups, each instruction field group including the at least one instruction field, a circuit for storing values to a plurality of registers based on the result of an operation, and an operation circuit for selecting whether an operation should be executed or not based on an evaluation of the values stored in the plurality of registers.

According to a further aspect of the present invention, there is provided a processing apparatus for executing a plurality of instruction fields in one instruction word in parallel, including a plurality of operation units provided corresponding to at least one instruction field among the plurality of instruction fields, each operation unit further comprising: an instruction register for holding said at least one instruction field; an operation circuit for executing an operation corresponding to said at least one instruction field, and a register for storing a value to determine execution or not execution of the operation of said operation circuit, and said operation circuit determines execution or not execution of said instruction depending on the value written into said register.

According to each structure explained above, the number of times of the transfer process of the operation result between a plurality of processing units to execute a plurality of operations can be reduced and thereby the number of steps of the processing program can also be reduced.

Therefore, according to the present invention, there is provided a processing unit in which a plurality of processing units execute in parallel the operations using with each other the results of operations in view of enabling the high speed operations.

In addition, according to the present invention, there is provided a processing unit in which a plurality of processing units execute in parallel the operations using with each other the results of operations in view of reducing the number of steps of the processing program.

Further, according to the present invention, there is provided a processing unit in which a plurality of processing units executes in parallel the operations using each other the results of operations in view of executing an instruction format which can realize high speed processing and reducing the number of steps of processing program.

With the advantages describe above, the present invention provides the effect that actual performances of the processing unit as a whole can be improved remarkably.

BRIEF DESCRIPTION OF THE DRAWINGS

The present invention will be more apparent from the following detailed description, when taken in conjunction with the accompanying drawings, in which:

Other objects and advantages of the present invention will be apparent from the following detailed description of the presently referred embodiments thereof, which description should be considered in conjunction with the accompanying drawings in which:

FIG. 2 is an explanatory diagram showing a program example using the C language;

FIG. 3 is an explanatory diagram showing an example compiled to the format applied to the processing unit of the related art;

FIG. 4 is an explanatory diagram showing an example compiled to the format applied to the predicate register type processing unit;

FIG. 11 is an explanatory diagram showing an example of the instruction word string compiled to the format applied to the predicate register type processing unit;

FIG. 12 is an explanatory diagram showing an example of the instruction word string compiled to the format applied to the predicate register type processing unit having the broadcasting function;

FIG. 13 is a block diagram showing a schematic structure of a predicate register updating means;

FIG. 15 is an explanatory diagram showing an example of the instruction word string compiled to the format applied to the predicate register type processing unit which can broadcast a read value.

DESCRIPTION OF THE PREFERRED EMBODIMENTS

The preferred embodiments of the present invention will be explained in detail with reference to the accompanying drawings.

Figure 5:
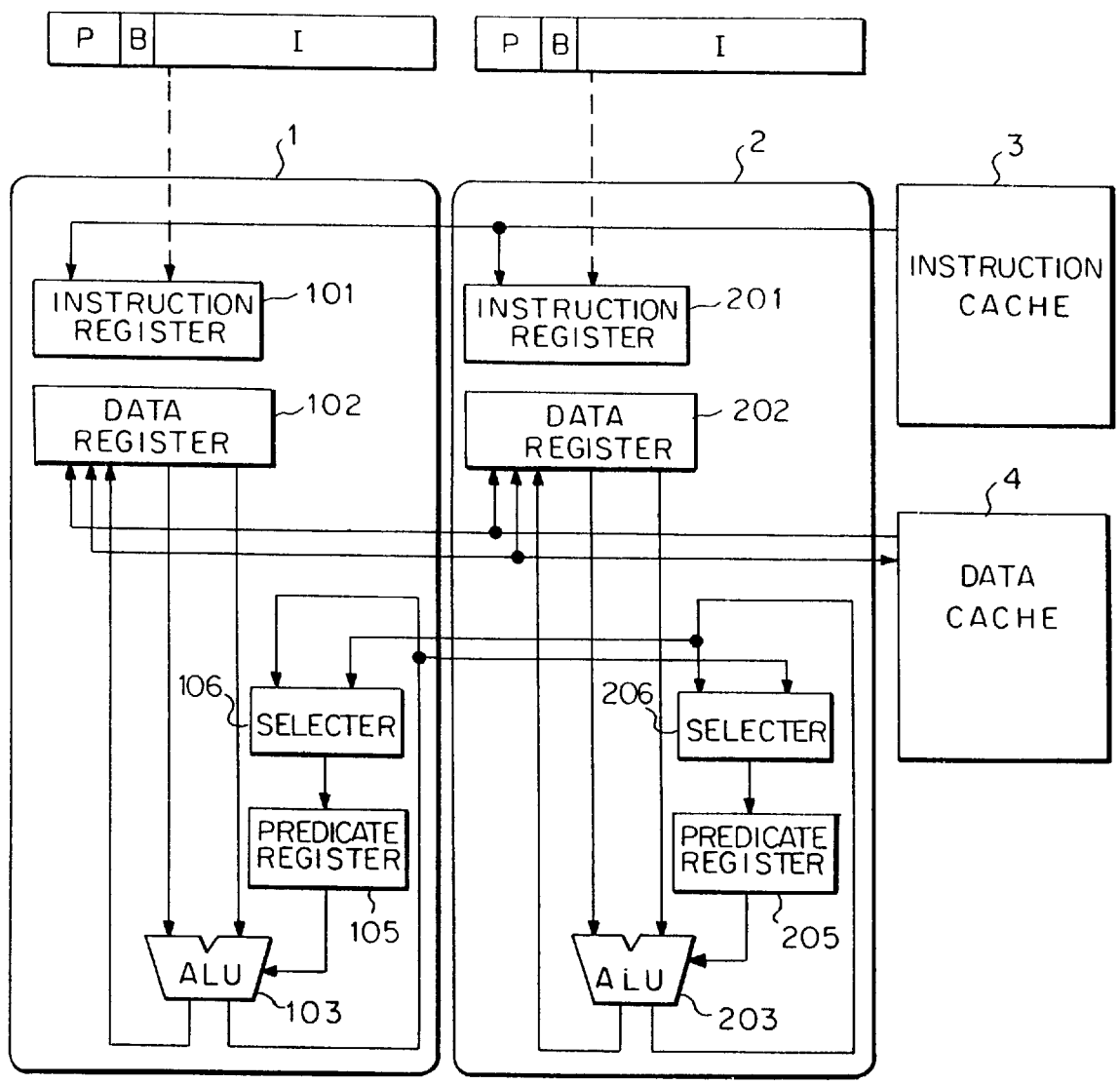
FIG. 5 is a block diagram showing the schematic structure of a processing unit of a preferred embodiment of the present invention.

FIG. 5 shows a schematic structure of a processing unit of a preferred embodiment of the present invention. In FIG. 5, the reference numerals 1 and 2 designate processing units; 3, an instruction cache; 4, a data cache. Although not illustrated in the figure, the processing unit, instruction cache and data cache of the present invention are desirable to be accommodated in one chip LSI. In addition to the elements shown in the figure, the one chip LSI also comprises the structural elements such as input/output sections but such structural elements are omitted here because these are not essentially related to the subject matter of the present invention and can be formed with the well known arts.

Figures 6, 7:
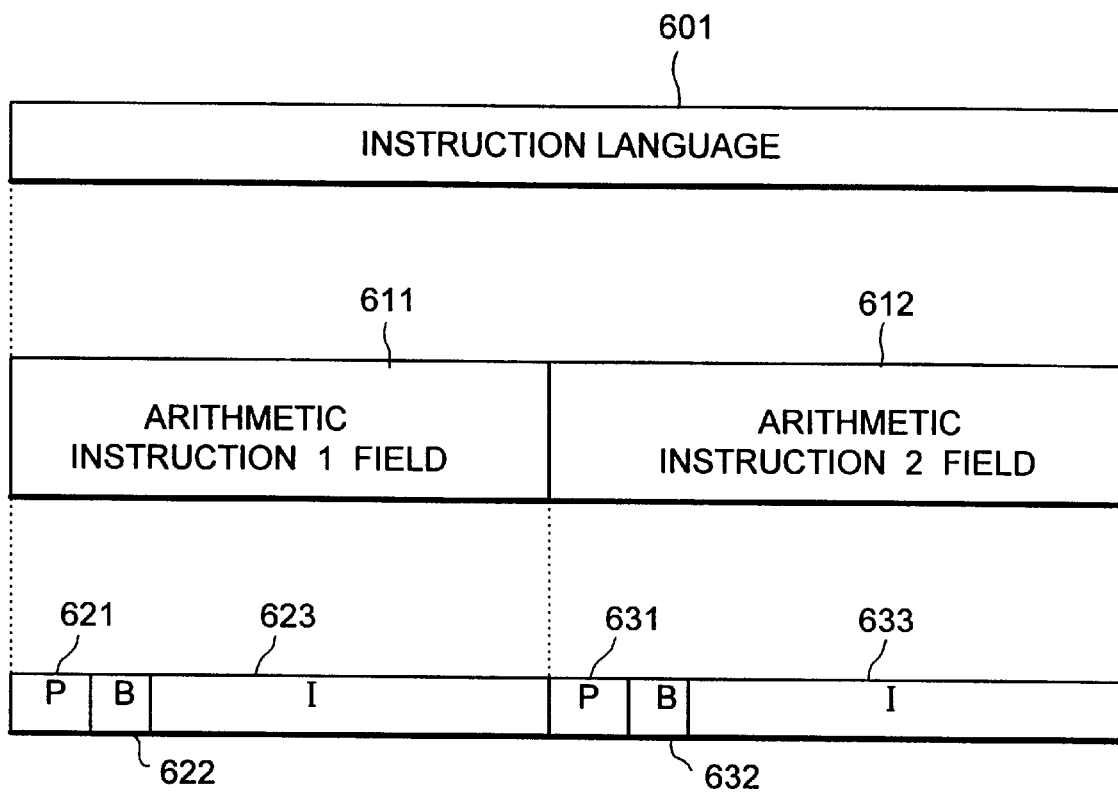
FIG. 6 is an explanatory diagram showing instruction words used in the preferred embodiment of the present invention.
FIG. 7 is an explanatory diagram showing a program example using the C language.

As shown in FIG. 6, an instruction word used in this embodiment is composed of an instruction 1 field and an instruction 2 field. The instruction 1 field and the instruction 2 field are respectively composed of the predicate register selection field (P field), predicate register broadcasting field (B field) and instruction field (I field). In FIG. 6, 601 designates an instruction word; 611, an instruction 1 field; 612, an instruction 2 field; 621 and 631, P field; 622 and 632, B field; 623 and 633, I field, respectively. Among these fields, the instruction 1 field is supplied to a processing unit 1 and the instruction 2 field, to a processing unit 2.

The format of the instruction word indicated here is only an example and it may be implemented by modifying the structure within the scope of the appended claims. For example, the instruction field is not always required to be two fields but it may also be changed to more fields, for example, four fields.

Returning to FIG. 5, a processing unit 1 is formed of the following structural elements. 101 designates an instruction register which holds the instruction 1 field regarding the processing unit 1 among the instructions read from the instruction cache 3. 102, a data register which holds an operand data for executing processing in the processing unit 1. 103, an ALU which executes the instruction designated by the instruction 1 field. 105, a predicate register which holds the information indicating that ALU 103 executes the instruction or not. 106, a selector for selecting an input data at the time of updating a value of the predicate register 105.

The processing unit 2 is formed of the same structural elements as that of the processing unit 1. Namely, the processing unit 2 comprises an instruction register 201, a data register 202, an ALU 203, a predicate register 205 and a selector 206.

Here, the data registers 102, 202, predicate registers 105 and 205 respectively have a plurality of register regions for selective use. For example, 32 data register regions are provided, five data register selection signals are input to the data registers 102 and 202 in order to select only one data register region from such regions. In this case, each data register region can be identified in general by assigning the numbers, for example, r0, r1, r2 . . . to the data register regions. This description can be applied not only to the data register but also to the predicate register.

Next, operations of this embodiment will then be explained. operations of an ordinary ALU other than that described here can be realized by the technique of the related art and the detailed explanation thereof will be omitted here.

First, the existing operations for executing the instruction string shown in FIG. 4 will be explained. FIG. 4 shows an example of the instruction string consisting of three instruction words which can be processed by only one processing unit.

The first instruction word is a comparison instruction (cmp.gt) which compares the data register region 1 (r1) and immediate value "2" to write "true" to the predicate register region 0 (p0) when the data register region 1 is larger but to write "false" in other cases. Here, the predicate register region to which a value is written among a plurality of predicate register regions included in the predicate register 105 is designated using a part of the predicate register selection field (P field) of the instruction 1 field. Moreover, the predicate register region for writing the value can also be designated, for example, by using a part of the instruction field (I field).

The second instruction word is a subtraction instruction (sub). In this instruction, the immediate value "1" is subtracted from r1 and the result is written back to r1. However, since this instruction word is located after a modification word "(p0)", if p0 is "true", this subtraction is executed but if p0 is "false", this subtraction is not executed.

The third instruction word is an addition instruction (add). When this instruction is issued, the data register region 2 (r2) and r1 are added and the result is written back to r2.

Figure 8:
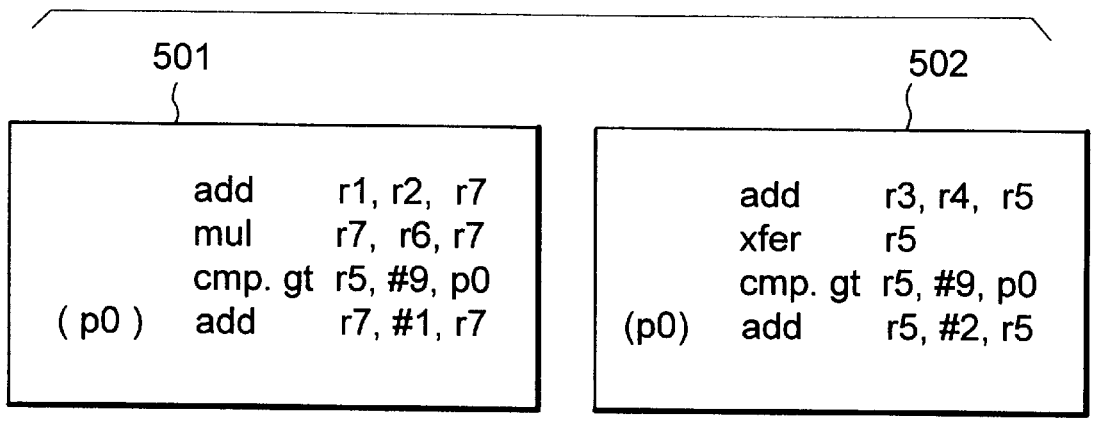
FIG. 8 is an explanatory diagram showing an example of the instruction word string compiled to the format applied to the predicate register type processing unit.

Next, this embodiment will be explained with reference to FIG. 7, FIG. 8 and FIG. 9. FIG. 7 shows another example of program using the C language, while FIG. 8 shows an example of the instruction word string compiled from the program of FIG. 7 into the format applied to the predicate register type processing unit of the related art. In FIG. 8, 501 designates an instruction word string applied to the processing unit 1; 502, an instruction word string applied to the processing unit 2. Here, it is assumed to simplify the explanation that the processing units 1 and 2 processes the instruction words in the same processing rate.

First, the processing unit 2 adds r3 and r4 depending on the first instruction word (add) and stores the result into r5. Simultaneously, the processing unit 1 adds r1 and r2 depending on the first instruction word (add) and stores the result into r7.

In the following steps, the processing unit 1 executes multiplication of r7 and r6 depending on the second instruction word (mul) and stores the result into r7. Simultaneously, the processing unit 2 transfers the value of data register depending on the second instruction word (xfer). In this example, the value held in the data register region 5 (r5) included in the data register 202 is written into the data register region 5 (r5) included in the data register 102.

In the next step, the processing units 1 and 2 execute a comparison instruction depending on the third instruction word (cmp.gt) and respectively stores the comparison result, that is the value evaluated the result of processing, into the predicate register region 0 (p0).

In the next step, moreover, when the value of p0 is "true", the processing unit 1 adds r7 and immediate value 1 depending on the fourth instruction word (add) and stores the result into r7. Simultaneously, the processing unit 2 adds, when the value of p0 is "true", r5 and immediate value 2 depending on the fourth instruction word (add) and stores the result into r5.

Figure 9:
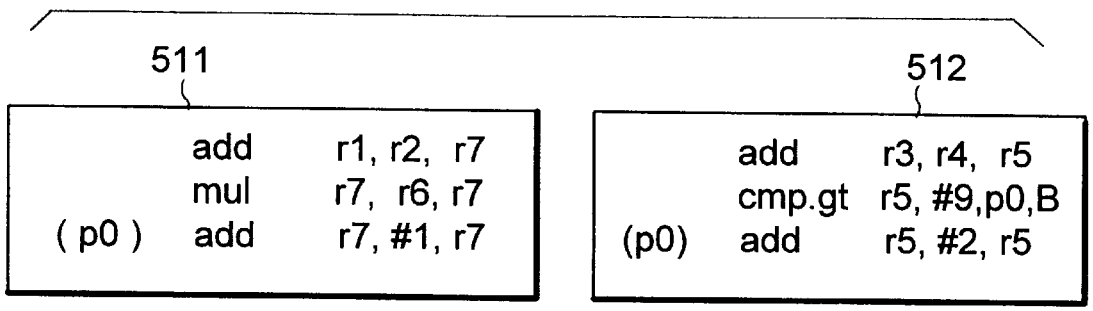
FIG. 9 is an explanatory diagram showing an example of the instruction word string compiled to the format applied to the predicate register type processing unit of the preferred embodiment.

Next, FIG. 9 shows an example of an instruction word string compiled from the program shown in FIG. 7 into the format applied to the predicate register type processing unit of this embodiment. In FIG. 9, 511 designates an instruction word string applied to the processing unit 1; 512, an instruction word string applied to the processing unit 2.

This embodiment is characterized by the B parameter which is additionally provided to the second instruction word (cmp.gt) of the instruction word string 512. This parameter corresponds to the predicate register broadcasting field (B field) in the instruction field and determines whether broadcast should be made to the other processing units or not for the updated predicate register. Of course the broadcast operation can be conducted where the result is communicated, sent or reported to one or more of the ALUs. When this second instruction word is executed, by the end of the execution cycle of said second instruction word, not only the value held in the predicate register region 0 (p0) of the processing unit 2 is updated to the value based on the result of the second instruction word but also the value held in the predicate register region 0 (p0) of the other processing unit, the processing unit 1 in this example is updated by the same way. This operation is realized by the selectors 106 and 206 (FIG. 5) of the processing units 1 and 2.

The B parameter of the instruction word string 512 controls both selector 106 of the processing units 1 and selector 206 of the processing units 2.

A compiler generating these instruction word strings 511 and 512 does not generate instruction words 511 and 512 which designate B parameters simultaneously In the case of the ordinary operation, the value of the predicate register broadcasting field (B field) is "false". In this case, the selector selects the write data to the predicate register generated by ALU in the same processing unit and stores this data into the predicate register. However, when the value of the predicate register broadcasting field (B field) is detected as "true" by designating the B parameter in the instruction words, the selector selects the write data outputted from the processing unit where the B field is "true" and stores this data into the predicate register.

Unnecessary transfer process of data register can be saved by providing a predicate register updating means having the characteristic that the broadcasting of update to the other processing unit is possible.

Figure 10:
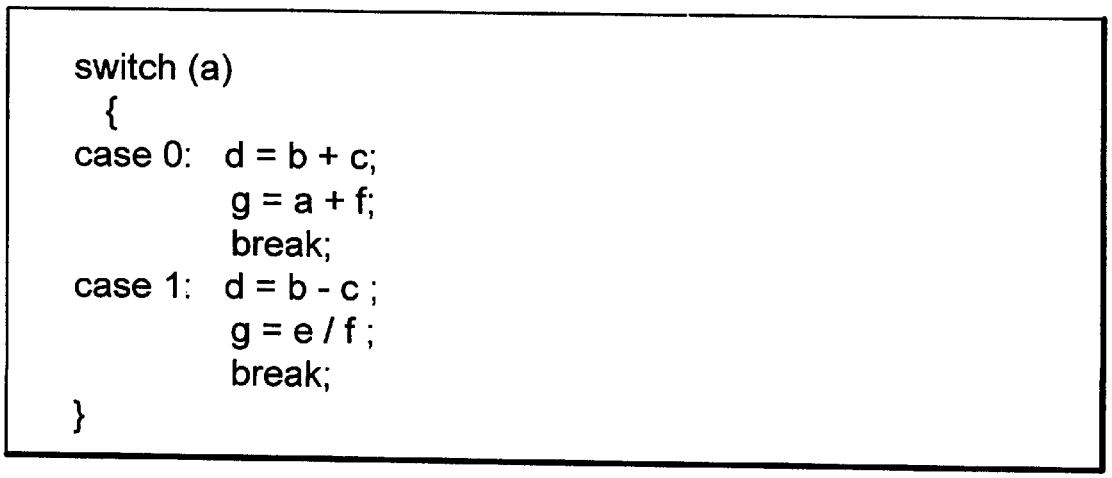
FIG. 10 is an explanatory diagram showing a program example using the C language.

Subsequently, the other examples of the present invention are shown in FIG. 10, FIG. 11 and FIG. 12. FIG. 10 shows an example of the program using the C language. FIG. 11 shows an example of the instruction word string compiled from the program shown in FIG. 10 into the format applied to the predicate register type processing unit. FIG. 12 shows an example of the instruction word string compiled into the format applied to the predicate register type processing unit having the broadcasting function from the program shown in FIG. 10.

In this embodiment, the processing unit is based on the precondition that it has three or more processing units. As will be understood from the figures, as explained above, the instruction word string can be simplified by generating the instruction word string which can effectively use the broadcasting function.

A compiler for the present invention also has the feature. In compiling the C language instruction strings in FIG. 7, when the compiler detects revising "e" and "g" are independent each other, it decides that an operation with "e" and an operation with "g" are executed in the respective processing unit, and when the compiler detects revising "e" and "g" are depended on the result of a conditional equation, the compiler decides that one processing unit executes the conditional equation and also reports the result to the other processing unit. Therefore the instruction strings shown in FIG. 9 are generated.

Figure 1:
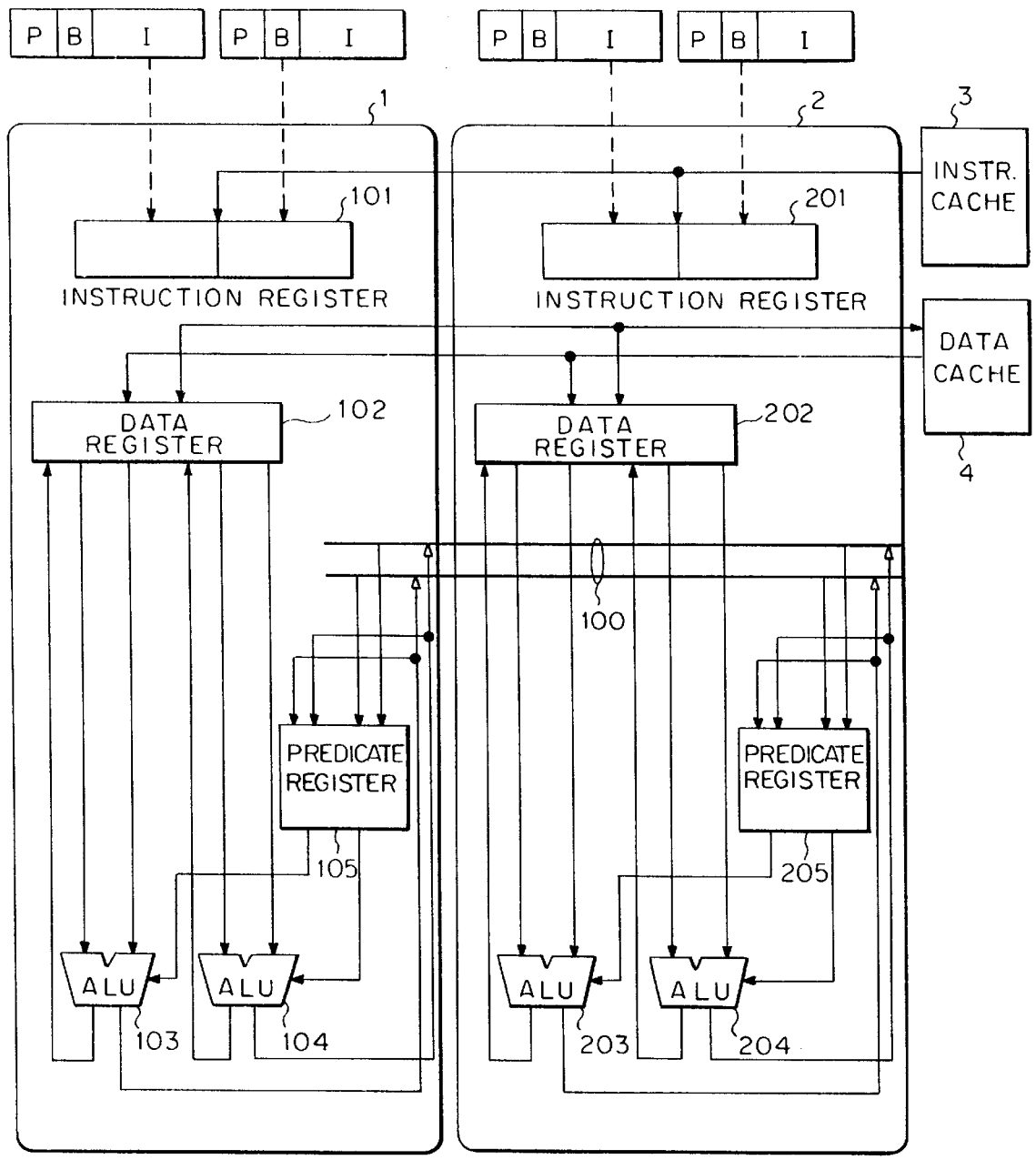
FIG. 1 is a block diagram showing a schematic structure of a processing unit as the other embodiment of the present invention.

Another embodiment of the present invention will subsequently be explained with reference to FIG. 1. FIG. 1 shows a schematic structure of the processing unit like FIG. 5 and the processing unit should desirably be formed of one chip LSI. The embodiment of FIG. 1 is mainly different in the structure from the embodiment shown in FIG. 5. Namely, different number of ALU is comprised in one processing unit (one in FIG. 5 and two in FIG. 1) and broadcasting of the write data to the predicate register is executed via the bus 100 in place of the selector. In following explanation, difference in structure or operation from that of the first embodiment will be explained.

In this embodiment, the instruction word is composed of an instruction 1 field, an instruction 2 field, an instruction 3 field and an instruction 4 field. The structural element of each instruction field is same as that in the first embodiment. Of these instruction fields, the instruction 1 field and the instruction 2 field are supplied to the processing unit 1 as the first instruction field group, while the instruction 3 field and the instruction field 4 to the processing unit 2 as the second instruction field group. Since each processing unit comprises two units of ALU, the instruction registers 101 and 201 are structured to simultaneously store two instruction fields.

The values output from ALU for writing into the predicate register are respectively written into the predicate register in the processing unit and can also be output to the bus used for broadcasting to the other predicate registers. The values output from each ALU for writing into the predicate register are simultaneously broadcasted to the designated predicate register regions of all processing units via such broadcasting bus and are then stored therein.

With introduction of such structure, the number of processing units and ALU can be increased under the condition that increase of delay of signal by multiple input selector and the mounting area to independently connect many signals can be minimized.

Next, FIG. 13 shows detail of the predicate register updating means shown in FIG. 1. In FIG. 13, reference numeral 11 designates a predicate register broadcast mediating circuit to determine from which ALU the output should be broadcasted; 12, a predicate register broadcast selector for selecting an output determined by the circuit 11; 13, an exception generating circuit in relation to the broadcasting; 14, an exception signal generated from the exception generating circuit; 15, an exception processing circuit for receiving an exception signal 14; 16, an operation stop signal output from the exception processing circuit 15; 107 and 207, a instruction mask device (AND circuit) to determine whether ALU 103 and 203 should be operated or not based on the values stored in the predicate registers 105 and 205; 108 and 208, predicate register broadcasting data supplying means (OR circuit) for supplying the predicate register writing value when it is broadcasted. Each structural element should be formed as one chip LSI. A dotted line in FIG. 13 indicates the circuit connecting ALU and data register which are not related in direct to above explanation.

The predicate register broadcast mediating circuit 11 determines ALU providing the result of operation to be broadcasted on the basis of the value of the B field included in the instruction registers 101 and 201 and informs it to the predicate register broadcasting selector 12. The determination method can be selected freely, but, for example, the method depending on the fixed priority sequence preset to the processing unit or the method where an exception is generated as a resource collision error for the simultaneous broadcasting from a plurality of processing units may be considered. The exception generating circuit 13 is used to generate such exception signal 14 and the exception processing circuit 15 supplies the operation stop signal 16 depending on this exception signal 14. Thereby, operation of processing unit is stopped, resulting in the reset waiting condition.

The predicate register broadcasting selector 12 broadcasts, if necessary, the result of operation of each processing unit based on determination of the mediating circuit 11.

The data broadcasted is supplied to the predicate registers 105 and 205 by the predicate register broadcast data supplying means 108 and 208. The predicate register broadcast data supplying device 108 and 208 are formed of the circuit for obtaining simple logical sum OR. This circuit is not always required to be the means for obtaining the OR. For example, it may be the selecting circuit for selectively supplying the broadcast data, when the broadcast data is being supplied or supplying the data output from ALU within the processing unit when such broadcast data is not supplied.

It is assumed that the predicate registers 105 and 205 have a plurality of memory regions. At the time of storing a value to the predicate register, the predicate register region in which the value is to be stored is determined by the value of operand stored in the instruction registers 101 and 201. In addition, the predicate register from which the value is read at the time of reading the value from the predicate register is also determined by the value of operand stored in the instruction registers 101 and 201. Such information related to selection of the predicate register region is stored in the P field or I field of the instruction register.

In above embodiments, selection of the predicate register value between the processing units has been realized by the method for selecting the data to be written into the predicate register. Namely, the predicate register value has been selected by changing the ALU of which output is written into the predicate register. However, selection of the predicate register value can be realized by using the method for selecting the data to be read from the predicate register.

An embodiment using this method will be explained with reference to FIG. 14 and FIG. 15. FIG. 15 shows an example of the instruction word string compiled from the program shown in FIG. 10 into the format applied to the predicate register type processing unit having the function to broadcast the read value. Here, the processing unit number is designated in the instruction word indicating the predicate register in order to show the predicate register to which reference should be made. For example, the heading section "(p0: 1)" of the third instruction word of the processing unit 2 specifies that reference should be made to the predicate register region 1(p1) of the processing unit 1.

Figure 14:
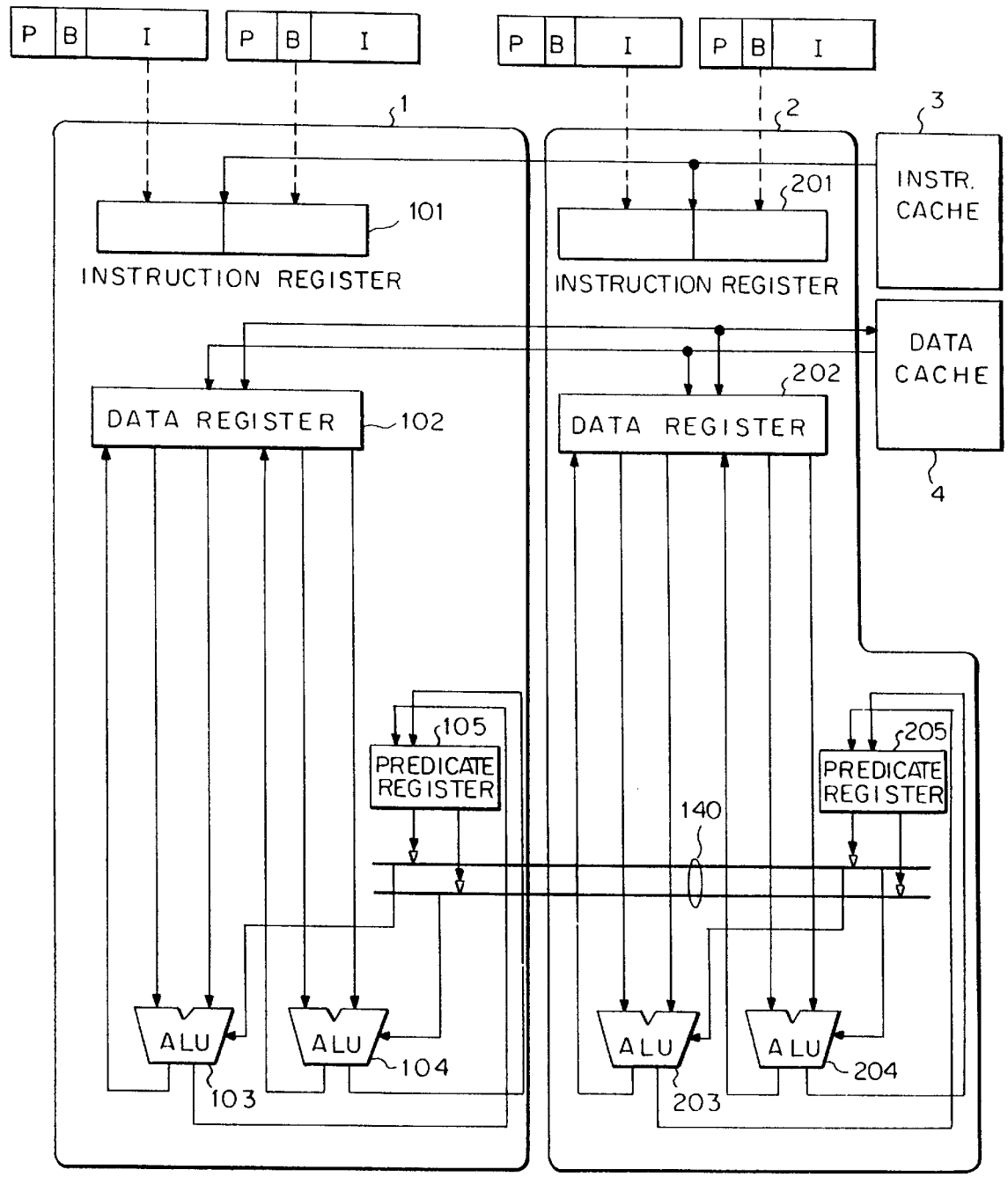
FIG. 14 is a block diagram showing a schematic structure of the processing unit as the other embodiment of the present invention.

FIG. 14 shows a schematic structure of the processing unit of this embodiment to realize the function explained above. In this embodiment, there is a structural difference from the embodiment of FIG. 1 in the point that the writing value of the predicate register is not broadcasted but the read value from the predicate register is broadcasted. Difference of structure or operation from the above embodiment will be mainly explained below.

The values which are outputted from each ALU for writing into the predicate register are written respectively into the predicate registers provided in the processing unit. The values read from the predicate registers are outputted to the bus 140 for predicate broadcast. By way of this bus, each ALU can realize reference to the predicate register value stored in any processing unit. The value of predicate register to be referred is determined, as explained above in regard to FIG. 15, depending on the processing unit number designated in the instruction word for making reference to the predicate register.

With introduction of this structure, the number of processing units and ALU can be increased under the condition that signal delay due to multiple-input selector and increase of mounting area to independently connect many signal lines are minimized.

Although preferred embodiments of the present invention have been described and illustrated, it will be apparent to those skilled in the art that various modifications may be made without departing the principles of the invention.

For example, in above embodiments, it is described that two processing units in maximum are used and two ALU in maximum are also used for one processing unit, but there is no restriction for these values and the number of processing units and ALU can be increased or decreased as required.

Moreover, structure of the instruction word and instruction field is described in above embodiments but this structure itself is not restricted thereto and may be modified freely.

In above embodiments, it is also described that data writing and reading can be made to the predicate register using the particular bus, but it is only for simplification of explanation. For example, it is of course possible to employ the structure to transfer the data between the desired data register and desired predicate register.

As described previously, according to the present invention, there is provided a processing unit comprising a plurality of processing units to execute in parallel a plurality of operations, wherein an instruction format, which can save the number of times of the transfer operation of operation result between a plurality of processing units, is utilized. Thereby, the number of steps of the processing program can be reduced.

Furthermore, since the number of signal lines required for update of the predicate registers between the processing units is smaller than the bit width required for transfer of contents of the data register, the circuits may be mounted within a narrower area and transfer of data between the processing units may be realized at a higher speed.

Figure 16:
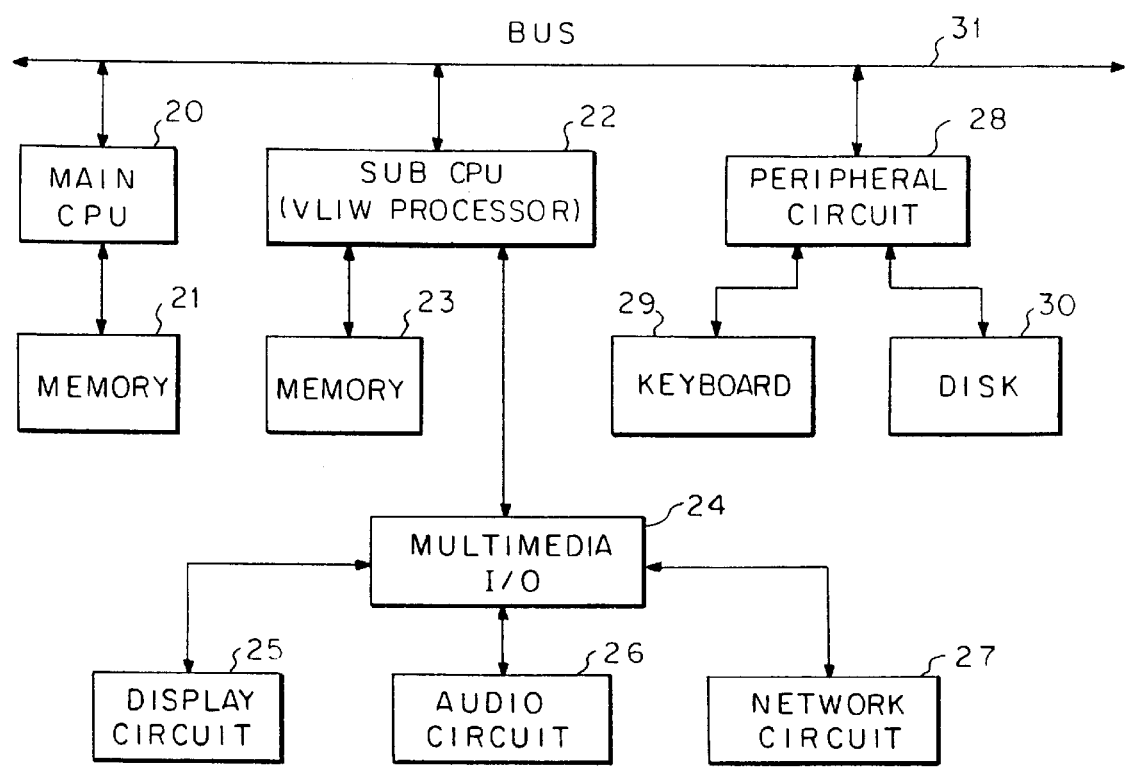
FIG. 16 is a block diagram showing a schematic structure of the information processing system as the application of the present invention.

FIG. 16 shows the information processing system using the present invention as a sub processor for processing multimedia data. In FIG. 16, 20 designates a main processor which wholly manages the information processing system, 21 designates a main memory for storing main program, 22 designates a sub processor which operates according to the present invention as described above with respect to FIGS. 1,5,13 and 14, 23 designates a sub memory which the instruction word strings are stored in, 24 designates a multimedia I/O circuit for managing multimedia data for the sub processor 22, 25 designates a display circuit for displaying results or indicating operations, 26 designates an audio circuit for inputting/outputting audio data, 27 designates a network circuit for communicating data via network connected, 28 designates a peripheral circuit for controlling peripheral devices, 29 designates a keyboard device for inputting an operator's instruction, etc, 30 designates a disk storage device for storing the instruction word strings executed in the sub processor or data used for the program and said main program, 31 designates a bus which information flows on.

According to the system of the present invention, because the number of steps can be reduced, it is possible not only to enable high speed processing but to reduce the capacity of the sub memory and the storage device.

While the present invention has been described in detail and pictorially in the accompanying drawings it is not limited to such details since many changes and modifications recognizable to those of ordinary skill in the art may be made to the invention without departing from the spirit and the scope thereof.

What is claimed is:

1. A processing apparatus executing a plurality of instruction fields in one instruction word in parallel, comprising:
  a plurality of registers provided corresponding to a plurality of instruction field groups, each instruction field group including:
    at least one instruction field,
    a circuit for storing values to a plurality of registers based on the result of an operation, and
    an operation circuit for selecting whether an operation should be executed based on an evaluation of the values stored in said plurality of registers, said operation circuit having a register which is independent of the other registers in the other operation circuits, each of said independent registers being updated with a result of the evaluation.

2. A processing apparatus according to claim 1, further comprising:
  a circuit for selectively storing the values obtained by evaluating the result of the operation in the corresponding instruction field group and the value obtained by evaluating the result of the operation of the groups other than the corresponding instruction field group into said plurality of registers; and
  wherein said plurality of registers are evaluated only by the corresponding instruction field groups respectively.

3. A processing apparatus according to claim 2, wherein said circuit for storing values into said plurality of registers selects and stores, when the value obtained by evaluating the result of operation in the other instruction field group is sent into the values being sent and otherwise selects and stores the value obtained by evaluating the result of an operation in the corresponding instruction field group.

4. A processing apparatus according to claim 3, wherein said instruction field includes an instruction bit string for determining whether the value evaluating the result of an operation should be sent to said independent register each being included in at least one other instruction field group.

5. A processing apparatus according to claim 1, further comprising:
  a circuit for selectively evaluating values stored in said register of the corresponding instruction field group and values stored in said register of the groups other than the corresponding instruction field group; and
  wherein said plurality of registers are evaluated by any one instruction field group.

6. A processing apparatus according to claim 5,
  wherein said circuit for evaluating the values stored in said plurality of registers selects and evaluates, when the value stored in any one of said registers is broadcasted to all of a plurality of instruction field groups, the values being broadcasted and otherwise selects and evaluates the value stored in said register of the corresponding instruction field group.

7. A processing apparatus according to claim 6, wherein said instruction field includes an instruction bit string for determining whether the value stored in any one of said plurality of registers should be sent to said independent register each being included in at least one other instruction field group.

8. A processing apparatus executing a plurality of instruction fields in one instruction word in parallel, comprising:
  a plurality of registers provided corresponding to a plurality of instruction field groups, each instruction field group including:
    at least one instruction,
    a circuit for storing values to a plurality of registers based on the result of operation,
    an operation circuit for selecting whether operation should be executed or not based on evaluation of the values stored in said plurality of registers,
    a circuit for selectively storing the values obtained by evaluating the result of the operation in the corresponding instruction field group and the value obtained by evaluating the result of the operation of the groups other than the corresponding instruction field group into said plurality of registers,
  wherein said plurality of registers are evaluated only by the corresponding instruction field groups respectively;
  wherein said circuit for storing values into a plurality of registers selects and stores, when the value obtained by evaluating the result of operation in the other instruction field group is sent into the values being sent and otherwise selects and stores the value obtained by evaluating the result of operation in the corresponding instruction field group;
  a circuit for detecting that the value obtained by evaluating result of operation is sent out from two or more of instruction field groups, and
  a circuit for generating an exception signal based on the result of the detection.

9. A processing apparatus executing a plurality of instruction fields in one instruction word in parallel, comprising:
  a plurality of registers provided corresponding to a plurality of instruction field groups, each instruction field group including:
    at least one instruction field,
    a circuit for storing values to a plurality of registers based on the result of operation,
    an operation circuit for selecting whether operation should be executed or not based on evaluation of the values stored in said plurality of registers,
    a circuit for selectively evaluating values stored in the register of the corresponding instruction field group and values stored in the register of the groups other than the corresponding instruction field group,
  wherein said plurality of registers are evaluated by any one instruction field group;
  wherein said circuit for evaluating the values stored in a plurality of registers selects and evaluates, when the value stored in any one of said registers is broadcasted to all of a plurality of instruction field groups, the values being broadcasted and otherwise selects and evaluates the value stored in said register of the corresponding instruction field group;
  a circuit for detecting that the value stored in any one of said registers is sent out from two or more of instruction field groups, and
  a circuit for generating an exception signal based on the result of the detection.

10. A processing apparatus according to claim 9,
  wherein said value obtained by evaluating the result of operation is sent by way of a common bus line.

11. A processing apparatus executing a plurality of instruction fields in one instruction word in parallel, comprising:

a plurality of operation units provided corresponding to at least one instruction field among said plurality of instruction fields, each operation unit comprising:
- an instruction register for holding said at least one instruction field,
- an operation circuit for executing an operation corresponding to said at least one instruction field, and
- a register for storing a value used to determine whether execution of an operation by said operation circuit is to be performed,
- wherein said operation circuit determines whether execution of said instruction is to be performed depending on the value written into said register, said operation circuit having a register which is independent of the other registers in the other operation units, each of said independent registers being updated with a result of the evaluation.

12. A processing apparatus according to claim 11, further comprising:
- a circuit for writing the value obtained by evaluating the result of an operation of a predetermined instruction to the registers in at least one operation unit; and
- wherein said operation circuit determines execution or not execution of said instruction for which the register is designated.

13. A processing apparatus according to claim 11, further comprising:
- a circuit for writing the value obtained by evaluating the result of an operation of a predetermined instruction to the register in its own operation unit; and
- wherein said operation circuit determines execution or not execution of the instruction for which said register in any operation unit is designated.

\* \* \* \* \*